United States Patent
Rademacher et al.

(10) Patent No.: US 9,248,824 B2
(45) Date of Patent: Feb. 2, 2016

(54) REAR DEFROST CONTROL IN STOP/START VEHICLE

(71) Applicant: FORD GLOBAL TECHNOLOGIES, LLC, Dearborn, MI (US)

(72) Inventors: Eric Michael Rademacher, Royal Oak, MI (US); Kirk Pebley, Novi, MI (US); James Rollinson, Superior Township, MI (US); Eric Gerd Schaefer, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 83 days.

(21) Appl. No.: 14/162,797

(22) Filed: Jan. 24, 2014

(65) Prior Publication Data
US 2015/0210265 A1    Jul. 30, 2015

(51) Int. Cl.
| | |
|---|---|
| *B60W 10/30* | (2006.01) |
| *F02N 11/08* | (2006.01) |
| *B60W 10/06* | (2006.01) |
| *H05B 1/02* | (2006.01) |
| *H05B 3/84* | (2006.01) |

(52) U.S. Cl.
CPC .............. *B60W 10/30* (2013.01); *B60W 10/06* (2013.01); *F02N 11/084* (2013.01); *H05B 1/0236* (2013.01); *H05B 3/84* (2013.01)

(58) Field of Classification Search
None
See application file for complete search history.

(56) References Cited

U.S. PATENT DOCUMENTS

| | | |
|---|---|---|
| 4,021,677 A | 5/1977 | Rosen et al. |
| 4,284,053 A | 8/1981 | Merrick |
| 4,408,582 A | 10/1983 | Merrick |
| 4,467,761 A | 8/1984 | Hasegawa |
| 4,479,472 A | 10/1984 | Shimamura |
| 4,520,271 A | 5/1985 | Goertler et al. |
| 4,625,281 A | 11/1986 | Deutsch |
| 4,788,487 A | 11/1988 | Picklesimer |
| 4,836,164 A | 6/1989 | Morozumi et al. |
| 4,898,005 A | 2/1990 | Sakurai |
| 5,072,597 A | 12/1991 | Bromley et al. |
| 5,163,399 A | 11/1992 | Bolander et al. |
| 5,216,895 A | 6/1993 | Kawai et al. |
| 5,365,445 A | 11/1994 | Takizawa |

(Continued)

FOREIGN PATENT DOCUMENTS

| | | |
|---|---|---|
| DE | 3307220 | 9/1984 |
| EP | 2138712 A1 | 12/2009 |

(Continued)

*Primary Examiner* — Rami Khatib
*Assistant Examiner* — David Merlino
(74) *Attorney, Agent, or Firm* — David B. Kelley; Brooks Kushman P.C.

(57) ABSTRACT

A method for controlling a stop/start vehicle includes commanding an engine auto start in response to a calibratable time interval elapsing after receiving an electric defroster activation request when the engine is auto stopped. The method may further include activating a defroster after the engine has been auto started. The method may additionally include activating a defroster indicator when the electric defroster activation is received. The method may further include inhibiting an engine auto stop in response to an electric defroster activation request when the engine is running and further in response to a battery charge being insufficient to support a predicted current draw, and signaling an alert to a vehicle driver.

13 Claims, 3 Drawing Sheets

(56) References Cited

U.S. PATENT DOCUMENTS

| | | | |
|---|---|---|---|
| 5,463,993 A | 11/1995 | Livshits et al. | |
| 5,559,704 A | 9/1996 | Vanek et al. | |
| 5,806,485 A | 9/1998 | DeGeorge | |
| 6,037,749 A | 3/2000 | Parsonage | |
| 6,226,585 B1 | 5/2001 | Cullen | |
| 6,363,906 B1* | 4/2002 | Thompson et al. | 123/198 DB |
| 6,379,283 B1 | 4/2002 | Cullen | |
| 6,429,539 B1 | 8/2002 | Suzuki et al. | |
| 6,553,958 B1 | 4/2003 | Kolmanovsky et al. | |
| 6,564,774 B2 | 5/2003 | Ellims et al. | |
| 6,608,394 B2 | 8/2003 | Osada et al. | |
| 6,668,224 B2 | 12/2003 | Kawai et al. | |
| 6,755,032 B1 | 6/2004 | Kotwicki et al. | |
| 6,763,296 B2 | 7/2004 | Aldrich, III et al. | |
| 6,805,090 B2 | 10/2004 | Bertness et al. | |
| 6,845,305 B1 | 1/2005 | Raftari et al. | |
| 7,017,360 B2 | 3/2006 | Kotwicki et al. | |
| 7,032,393 B2 | 4/2006 | Tamai et al. | |
| 7,552,705 B2 | 6/2009 | Serkh et al. | |
| 7,635,922 B2 | 12/2009 | Becker | |
| 7,745,953 B2 | 6/2010 | Puccetti et al. | |
| 8,205,594 B2 | 6/2012 | Fore et al. | |
| 8,406,954 B2 | 3/2013 | Whitney et al. | |
| 8,560,202 B2 | 10/2013 | Pebley et al. | |
| 2001/0010261 A1* | 8/2001 | Oomura et al. | 165/42 |
| 2003/0018415 A1 | 1/2003 | Sonobe et al. | |
| 2003/0233835 A1 | 12/2003 | Tomita et al. | |
| 2004/0089258 A1* | 5/2004 | Buglione | B60W 10/06 123/179.4 |
| 2004/0112074 A1 | 6/2004 | Komura et al. | |
| 2005/0044873 A1 | 3/2005 | Tamai et al. | |
| 2005/0193747 A1 | 9/2005 | Kajimoto et al. | |
| 2006/0028778 A1 | 2/2006 | O'Gorman et al. | |
| 2006/0137643 A1 | 6/2006 | Thompson et al. | |
| 2007/0007056 A1 | 1/2007 | Bowers et al. | |
| 2007/0255488 A1 | 11/2007 | Okubo et al. | |
| 2007/0288154 A1* | 12/2007 | Letang | 701/112 |
| 2008/0306670 A1 | 12/2008 | Masterson et al. | |
| 2009/0015203 A1 | 1/2009 | Oakes | |
| 2009/0018707 A1 | 1/2009 | Oakes | |
| 2009/0024264 A1 | 1/2009 | Aldrich, III et al. | |
| 2010/0042277 A1 | 2/2010 | Naik et al. | |
| 2010/0050671 A1 | 3/2010 | Kahn et al. | |
| 2010/0125383 A1 | 5/2010 | Caouette | |
| 2010/0145562 A1 | 6/2010 | Moran | |
| 2010/0163220 A1 | 7/2010 | Nakajima | |
| 2012/0083988 A1 | 4/2012 | Miyata et al. | |
| 2012/0215430 A1* | 8/2012 | Watanabe | F02N 11/084 701/113 |
| 2012/0253595 A1 | 10/2012 | Oakes | |
| 2012/0271525 A1 | 10/2012 | Bucci et al. | |
| 2012/0304670 A1 | 12/2012 | Kumar et al. | |
| 2013/0018569 A1* | 1/2013 | Sangameswaran et al. | 701/112 |
| 2013/0060444 A1 | 3/2013 | Matsunaga et al. | |
| 2013/0158838 A1* | 6/2013 | Yorke et al. | 701/103 |
| 2013/0226440 A1* | 8/2013 | Rademacher | F02N 11/0818 701/113 |
| 2013/0245925 A1* | 9/2013 | Malone et al. | 701/113 |

FOREIGN PATENT DOCUMENTS

| | | |
|---|---|---|
| JP | 58209613 | 12/1983 |
| JP | 10304503 A | 11/1998 |
| WO | 2008089935 A1 | 7/2008 |

* cited by examiner

REAR DEFROST CONTROL IN STOP/START VEHICLE

TECHNICAL FIELD

This disclosure relates to stop/start vehicles and controlling stop/start activities when a driver activates a rear defroster in the stop/start vehicle.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A method for controlling a stop/start vehicle includes commanding an engine auto start in response to a calibratable time interval elapsing after receiving an electric defroster activation request when the engine is auto stopped. In one embodiment, the method further includes activating a defroster after the engine has been auto started. In another embodiment, the method further includes activating a defroster indicator when the electric defroster activation is received. In yet another embodiment, the method further includes inhibiting an engine auto stop in response to an electric defroster activation request when the engine is running and further in response to a battery charge being insufficient to support a predicted current draw. Such an embodiment may additionally include signaling an alert to a vehicle driver.

A stop/start vehicle includes an electric defroster with a defroster indicator and at least one controller. The controller is configured to activate the defroster indicator when a defroster activation request is received and command an engine auto start a calibratable time interval after the defroster activate request is received. In one embodiment, the controller is further configured to activate the electric defroster when the engine is auto started after the calibratable time interval. In an exemplary embodiment, the calibratable time interval is fifteen seconds.

A vehicle includes an engine having auto start and auto stop functions, an electric defroster, and a controller. The controller is configured to command an engine auto start in response to a calibratable time interval elapsing after an electric defroster activation request when the engine is auto stopped, and to inhibit an engine auto stop in response to an electric defroster activation request and a battery charge being insufficient to support an engine-off electric current draw. In one embodiment, the vehicle further includes a defroster indicator. In such an embodiment, the controller is further configured to activate the defroster indicator when the electric defroster activation is received while the engine is auto stopped. In another embodiment, the controller is further configured to signal an alert to a driver when the engine auto stop is inhibited in response to an electric defroster activation request and a battery charge being insufficient to support an engine-off electric current draw.

Embodiments according to the present disclosure provide a number of advantages. For example, the present disclosure provides a stop/start vehicle having control logic to delay an engine restart and activation of an electric defroster after receiving a defroster request, thus enabling the engine to remain auto stopped longer and avoiding driver surprise caused by an immediate engine restart. As another example, the present disclosure provides a stop/start vehicle having control logic to prevent an engine auto stop when an electric defroster is active if the battery state of charge is insufficient to support engine-off current draw.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
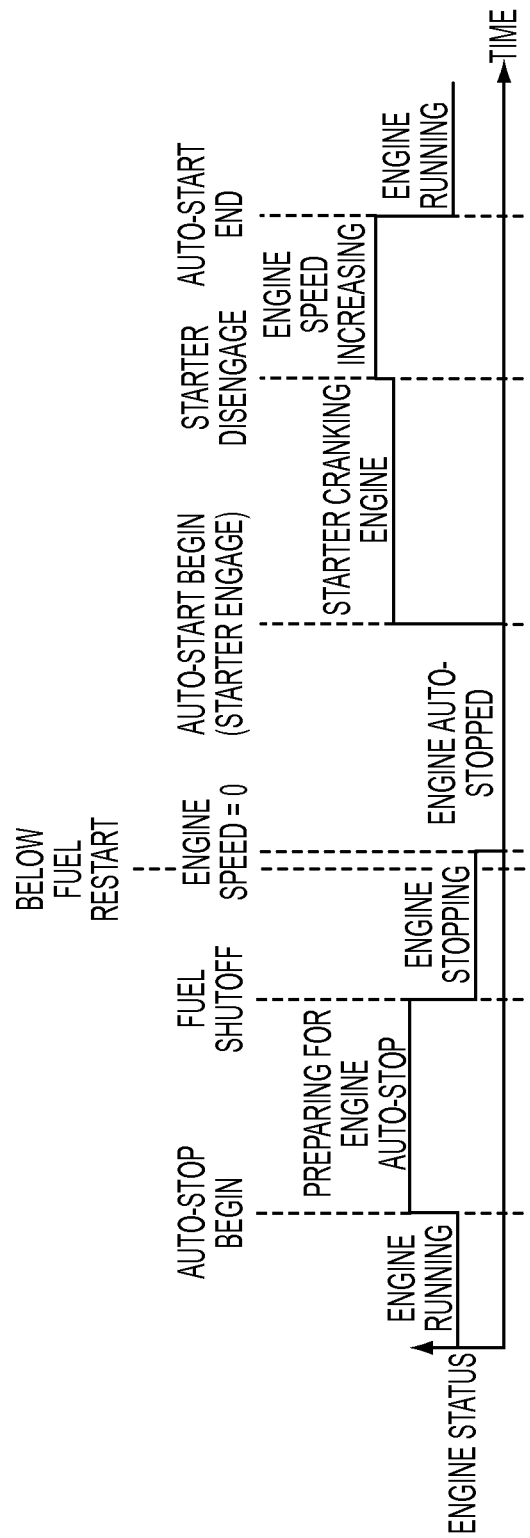
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In stop/start vehicles, the stop/start system may automatically shut down the engine in order to save fuel, and at a later time automatically restart the engine. However, in certain situations it is undesirable for the engine to automatically stop or automatically start according to the base logic. For example, electric window defrosters draw a relatively large amount of current. When an electric defroster is running, the battery state of charge may be insufficient to support the electric power demand if the engine is auto stopped. Similarly, if the engine is auto stopped and a driver activates the defroster, the battery state of charge may be insufficient to support the electric power demand if the engine remains off.

One solution is to inhibit engine auto stops whenever the defroster is active. However, this may unnecessarily leave the engine running when the battery charge is capable of supplying power to the defroster, wasting fuel. Furthermore, if the engine is auto started immediately upon activation of the defroster, the driver may be surprised, decreasing customer satisfaction.

Certain systems and methods disclosed herein may provide an improved stop/start control configuration for an engine having auto-stop functionality. When a defroster is active, a controller may selectively inhibit an engine auto start request in response to a battery charge being insufficient to supply a predicted electric current demand. Furthermore, if the engine is auto stopped and an auto start request is issued, the controller may delay the engine auto start and delay activation of the defroster until the engine has auto started.

Figure 2:
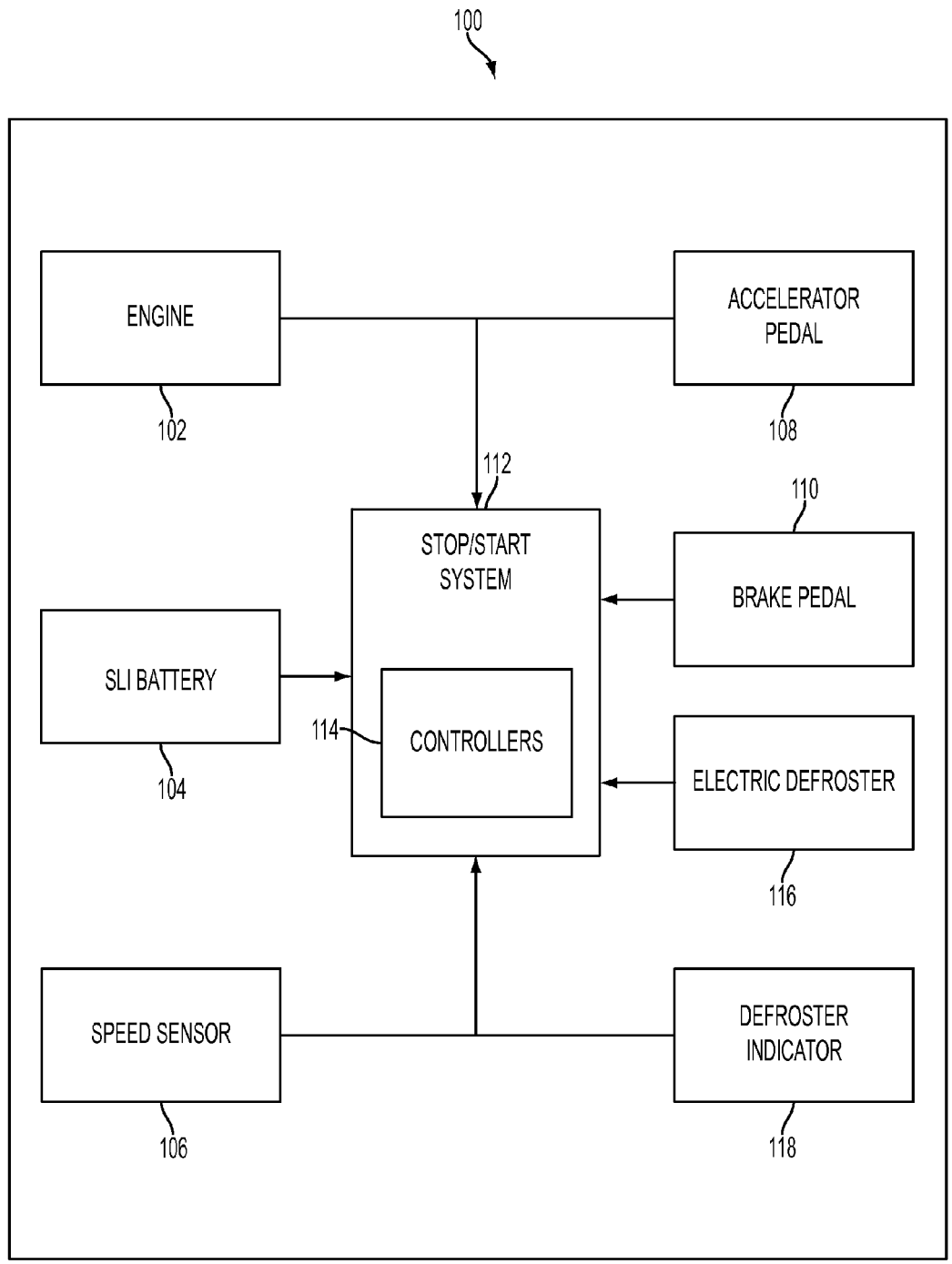
FIG. 2 is a block diagram of a stop/start vehicle.

With reference to FIG. 2, a schematic representation of a vehicle 100 having auto-stop functionality is shown. The vehicle 100 includes an engine 102, an SLI battery 104, a speed sensor 106, an accelerator pedal 108, and a brake pedal 110. The vehicle further includes a stop/start system 112 including at least one controller 114. The vehicle additionally includes an electric defroster 116 and a defroster indicator 118. In an exemplary embodiment, electric defroster 116 is a rear window defroster, and defroster indicator 118 is an indicator light proximate a defroster activation switch. The engine 102, SLI battery 104, speed sensor 106, accelerator pedal 108, brake pedal 110, electric defroster 116, and defroster indicator 118 are all in communication with or under the control of the stop/start system 112, as indicated by solid line.

The at least one controller 114 may issue auto-stop commands and auto-start commands to the engine 102 during vehicle operation. The stop/start system 112, for example, comprises a base auto-stop/start logic that issues auto-stop commands and auto-start commands—to achieve, among other things, stages similar to that described with reference to FIG. 1—based on signals from at least the speed sensor 106, accelerator pedal 108, and brake pedal 110. In short, the engine 102 will be shut down in response to an auto-stop command and will be restarted in response to an auto-start command.

Figure 3:
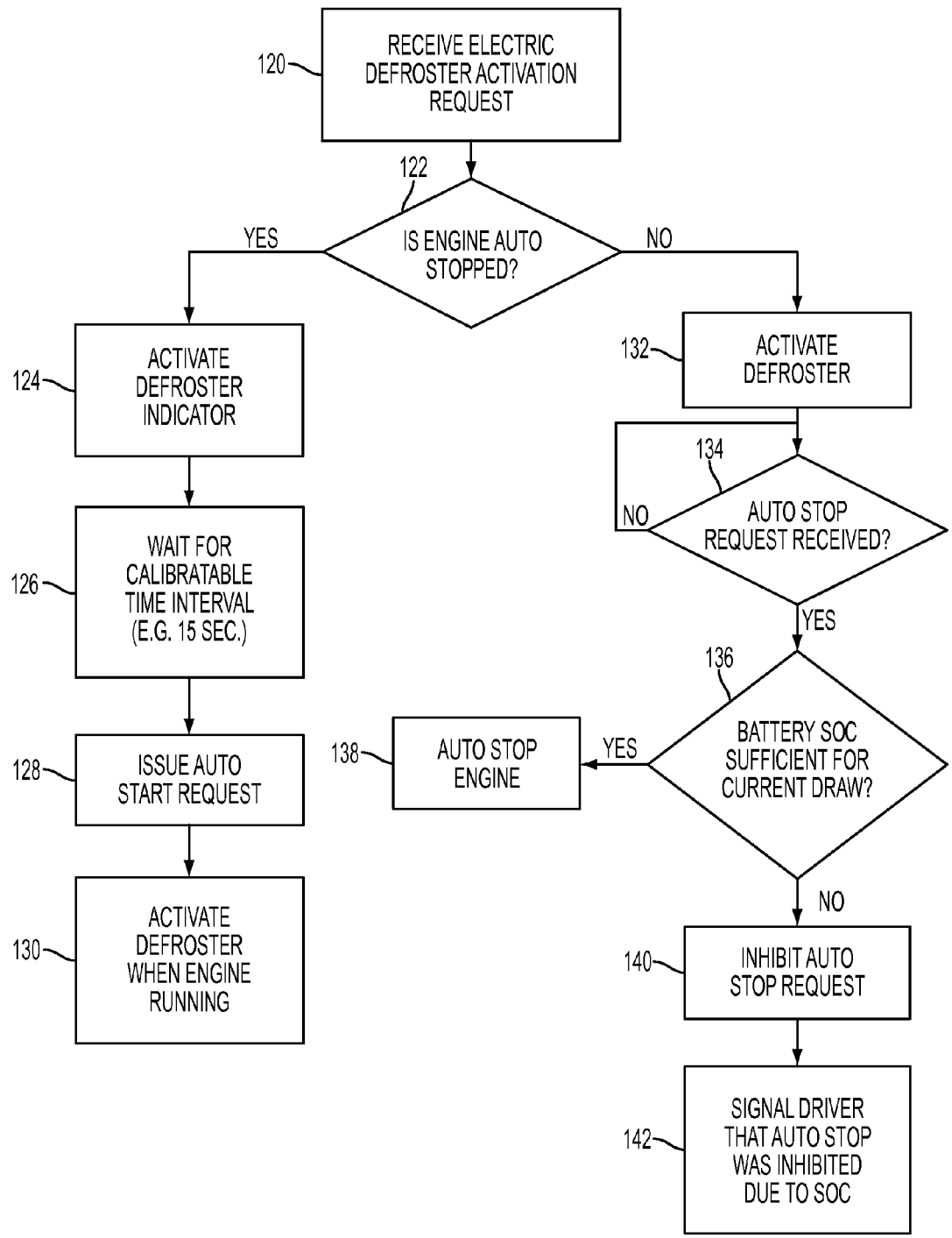
FIG. 3 is a flowchart illustrating an algorithm for controlling a start/stop vehicle.

In an embodiment described with reference to FIGS. 2 and 3, an electric defroster activation request is received, as illustrated at block 120. The defroster activation request may be initiated, for example, by a driver pushing a defroster button. A determination is then made of whether the engine is auto stopped, as illustrated at operation 122. This determination may be made, for example, by controller 114. If the engine is auto stopped, then defroster indicator 118 is activated, as illustrated at block 124. This informs the driver that the defroster request has been received. The operation then delays a calibratable time interval, as illustrated at block 126. The time interval may be approximately 15 seconds. Various other time delays are of course possible. After the calibratable time interval has elapsed, an engine auto start request is issued, as illustrated at block 128. This request may be issued by stop/start system 112. After the engine has been auto started and is running, defroster 116 is activated, as illustrated at block 130.

Returning to operation 122, if the engine is not auto stopped when the electric defroster activation request is received, then the defroster is activated upon receiving the request, as illustrated at block 132. After the defroster is activated, a determination is made of whether an auto stop request is received, as illustrated at operation 134. If no, then control continues to monitor for an auto stop request at operation 134. If yes, then a determination is made of whether the state of charge of battery 104 is sufficient to satisfy an engine-off current draw. In one embodiment, this determination is made by calculating a current draw for active electric devices including the defroster and comparing to a current battery state of charge. In another embodiment, a battery state of charge threshold is provided, and a current battery state of charge is compared to the state of charge threshold. If a determination is made that the battery state of charge is sufficient to satisfy the current draw, then the engine is auto stopped, as illustrated at block 138. If no, then the engine auto stop request is inhibited, as illustrated at block 140. An alert is signaled to the driver to indicate that an auto stop was inhibited because of low battery state of charge, as illustrated at block 142.

As can be seen from the various embodiments, the present disclosure provides a stop/start vehicle with control logic to delay engine auto starts and activation of an electric defroster for a time interval after defroster activation is requested. This delay decreases unnecessary engine starts, and furthermore reduces driver surprise caused by engine auto starts immediately after the defroster activation is requested. Furthermore, the present disclosure provides a stop/start vehicle with control logic to inhibit engine auto stops when a battery state of charge is insufficient to support an engine-off current draw.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an engine stop/start system in a vehicle, the method comprising:
   in response to receiving an electric defroster activation request when the engine is auto stopped, automatically activating a defroster indicator;
   automatically commanding an engine auto start in response to a calibrated time interval expiring, the time interval initiated upon receiving the electric defroster activation request; and
   automatically activating a defroster after the engine has been auto started.

2. The method of claim 1, wherein the time interval is fifteen seconds.

3. The method of claim 1, further comprising inhibiting an engine auto stop in response to an electric defroster activation request when the engine is running and further in response to a battery charge being insufficient to support a predicted current draw.

4. The method of claim 3, further comprising signaling an alert to a driver.

5. The method of claim 1, wherein automatically activating the defroster indicator is performed before automatically activating the defroster.

6. A stop/start vehicle comprising:
   an electric defroster having a defroster indicator; and
   at least one controller configured to activate the defroster indicator when a defroster activation request is received and command an engine auto start a calibrated time interval after the defroster activation request is received.

7. The stop/start vehicle of claim 6, wherein the controller is further configured to activate the electric defroster when the engine is auto started after the time interval.

8. The stop/start vehicle of claim 6, wherein the time interval is fifteen seconds.

9. The stop/start vehicle of claim 6, wherein the controller is configured to activate the defroster indicator in the absence of defroster operation.

10. A vehicle comprising:
    an engine configured to auto stop and auto start;
    an electric defroster;
    a defroster indicator; and
    a controller configured to activate the defroster indicator upon receiving an electric defroster activation request while the engine is auto stopped, command an engine auto start in response to a pre-selected time interval expiring, the time interval initiated upon receiving the electric defroster activation request when the engine is auto stopped, and to inhibit an engine auto stop in response to an electric defroster activation request and a battery charge being insufficient to support an engine-off electric current draw.

11. The vehicle of claim 10, wherein the controller is further configured to signal an alert to a driver when the engine auto stop is inhibited in response to an electric defroster being activated and a battery charge being insufficient to support a predicted engine-off electric current draw.

12. The vehicle of claim 10, wherein the controller is further configured to activate the defroster after commanding the engine auto start in response to the time interval expiring.

13. The vehicle of claim 12, wherein the controller is configured to activate the defroster indicator before activating the defroster.

* * * * *